A. CHAMBLEY.
VENTILATED PRISM.
APPLICATION FILED MAR. 24, 1911.

1,083,056.

Patented Dec. 30, 1913.

Witnesses
Walter Chism
Wills A. Burrowes.

Inventor—
Alexander Chambley
by his Attorneys—
Howson & Howson

UNITED STATES PATENT OFFICE.

ALEXANDER CHAMBLEY, OF PHILADELPHIA, PENNSYLVANIA.

VENTILATED PRISM.

1,083,056.   Specification of Letters Patent.   Patented Dec. 30, 1913.

Application filed March 24, 1911.   Serial No. 616,582.

*To all whom it may concern:*

Be it known that I, ALEXANDER CHAMBLEY, a citizen of the United States, residing in Philadelphia, Pennsylvania, have invented certain Improvements in Ventilated Prisms, of which the following is a specification.

One serious objection to the use of transparent prisms or lenses for transmitting light through pavements, ceilings, and the like has been that the ordinary changes of temperature occurring under conditions of use cause breakage of the relatively thick and heavy bodies of glass of which such prisms or lenses are necessarily made. This breakage was found to occur even though the glass had previously been annealed and regardless of the disposition of the cement or other supporting material immediately surrounding the lenses.

One object of my invention, therefore, is to provide a prism or lens of such construction that this breakage due to uneven expansion and contraction shall be to a great extent if not totally, prevented. This object I attain as hereinafter set forth, reference being had to the accompanying drawings, in which:—

Figure 1:
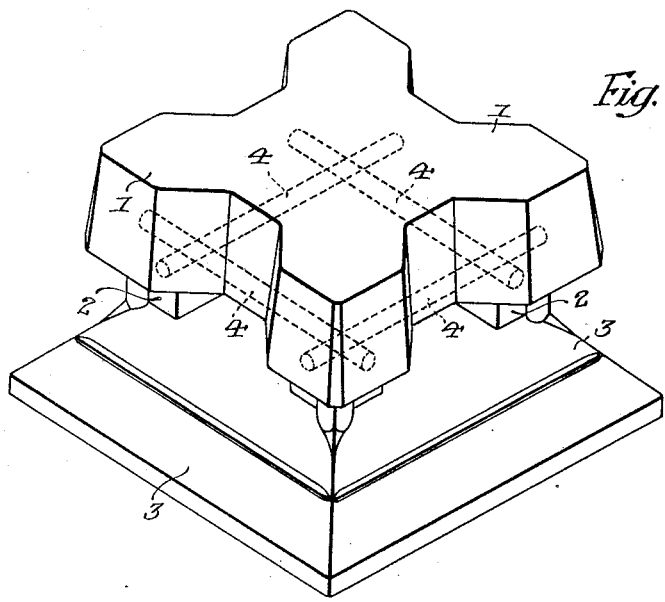
Figure 3:
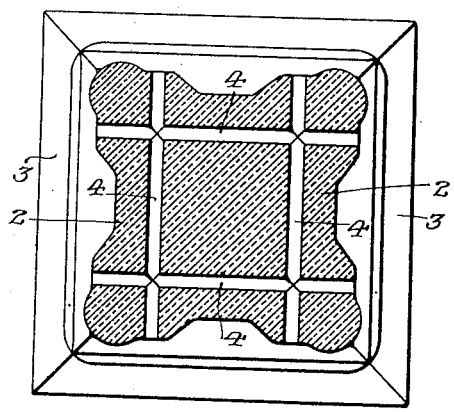
Figure 2:
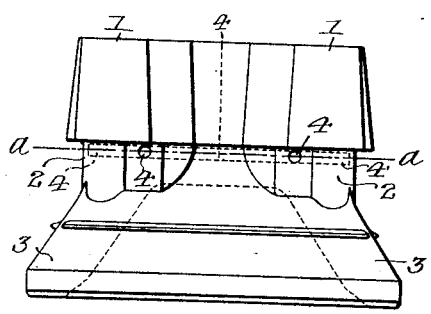

Figure 1, is a perspective view illustrating a well known form of glass prism or lens constructed according to my invention; Fig. 2, is a side elevation of the lens shown in Fig. 1, and Fig. 3, is a horizontal section on the line *a—a*, Fig. 2.

In the above drawings, 1 represents the head or main portion of a glass prism which in this instance overhangs the body portion 2 and is substantially square in outline though provided with an inwardly extending recess at the center of each of its sides. From the lower portion of the body there extends downwardly a skirt section 3 which is square in plan, so that the prism is recessed or hollow below the body and within the skirt as indicated in dotted lines in Fig. 2. In order to prevent the unequal expansion and contraction due to extreme or sudden changes of temperature, I form in the body of the prism a number of openings or channels 4 whereby a free circulation of air through the body of the glass prism may occur in order to equalize the temperature between the various parts of said prism, as by cooling the heated parts thereof and warming the colder portions.

When the prisms are embedded in cement mortar as is customarily the case, the latter is sufficiently porous to permit of sufficient circulation of the air through their bodies and the channels themselves permit changes due to expansion and contraction without permitting the excessive strains which otherwise might and frequently do cause breakage.

In the present instance I have shown two sets of parallel passages respectively at right angles to each other, but it is obvious that these may be arranged in various other ways to suit different forms and thicknesses of prisms or lenses without departing from my invention, for while I have for the sake of illustration shown my invention as applied to a well known form of generally square prism, it is likewise obvious that it may be applied to prisms of any desired shape and construction; the passages being extended through the proper parts in order to secure the above noted desirable results.

It is to be understood that by the term "lens" as used in the foregoing description and in the claims, I include any body of transparent material designed to transmit light.

I claim:—

1. A new article of manufacture consisting of a glass lens provided with inclosed passages extending through it in lines substantially parallel with the plane of its top surface.

2. As a new article of manufacture, a glass lens having a relatively thick body portion provided with a passage or passages extending through the same; said lens having overhanging head portions and the passage or passages opening below said head portions.

3. As a new article of manufacture a transparent lens having a substantially flat upper surface and provided with a relatively thick body portion, said portion having ventilating channels extending through it substantially parallel to the top surface of the lens.

4. As a new article of manufacture a lens of substantially rectangular section provided with a substantially flat top surface and having a plurality of passages substantially at right angles to each other extending through it in lines parallel to its top surface.

5. A new article of manufacture consisting of a lens having a passage or passages extending transversely through its body and opening on its sides.

6. A new article of manufacture consisting of a lens having a head, a body, and a skirt depending from said body, there being passages extending through the body and opening on the sides of the lens between the head and the skirt.

In testimony whereof, I have signed my name to this specification, in the presence of two subscribing witnesses.

ALEXANDER CHAMBLEY.

Witnesses:
WILLIAM E. BRADLEY,
WM. A. BARR.

Copies of this patent may be obtained for five cents each, by addressing the "Commissioner of Patents, Washington, D. C."